(12) United States Patent  (10) Patent No.: US 8,395,611 B2
Virtanen et al.  (45) Date of Patent: Mar. 12, 2013

(54) ACTIVE-MATRIX ELECTRONIC DISPLAY COMPRISING DIODE BASED MATRIX DRIVING CIRCUIT

(75) Inventors: Juhani Virtanen, Tampere (FI); Donald Lupo, Frankfurt (DE)

(73) Assignee: Smartrac IP B.V., Amsterdam (NL)

( * ) Notice: Subject to any disclaimer, the term of this patent is extended or adjusted under 35 U.S.C. 154(b) by 859 days.

(21) Appl. No.: 12/280,949

(22) PCT Filed: Dec. 19, 2006

(86) PCT No.: PCT/FI2006/050566
§ 371 (c)(1),
(2), (4) Date: Nov. 18, 2008

(87) PCT Pub. No.: WO2007/096456
PCT Pub. Date: Aug. 30, 2007

(65) Prior Publication Data
US 2009/0085904 A1  Apr. 2, 2009

Related U.S. Application Data (60) Provisional application No. 60/776,795, filed on Feb. 27, 2006.

(51) Int. Cl.
*G06F 3/38* (2006.01)
(52) U.S. Cl. .......... 345/211; 345/204; 345/84; 345/690; 345/215
(58) Field of Classification Search ............ 345/84–104, 345/204–215, 690–699
See application file for complete search history.

(56) References Cited

U.S. PATENT DOCUMENTS

| 4,666,252 A | 5/1987 | Yaniv et al. |
| 4,728,172 A | 3/1988 | Cannella |
| 5,353,138 A | 10/1994 | Van Winsum |
| 5,637,187 A | 6/1997 | Takasu et al. |
| 6,380,922 B1 * | 4/2002 | Lynch et al. .................. 345/107 |
| 6,445,374 B2 | 9/2002 | Albert et al. |
| 6,980,196 B1 | 12/2005 | Turner et al. |
| 7,256,386 B2 * | 8/2007 | Carlson et al. ............. 250/214.1 |
| 2002/0063683 A1 * | 5/2002 | Yi et al. ........................ 345/156 |
| 2002/0080637 A1 | 6/2002 | Yi et al. |
| 2003/0184510 A1 | 10/2003 | Chen |
| 2005/0110725 A1 * | 5/2005 | Kwak et al. ..................... 345/76 |
| 2005/0270283 A1 * | 12/2005 | Plut ................................ 345/211 |

(Continued)

FOREIGN PATENT DOCUMENTS

| WO | WO 2004/051750 A1 | 6/2004 |
| WO | WO 2004/066410 A1 | 8/2004 |

OTHER PUBLICATIONS

European Patent Office Search Report, dated Jul. 24, 2009, issued in connection with counterpart European Patent Application No. 06 83 0939.

(Continued)

*Primary Examiner* — William Boddie
*Assistant Examiner* — Towfiq Elahi
(74) *Attorney, Agent, or Firm* — Venable LLP; Eric J. Franklin (57) ABSTRACT

An active-matrix electronic display including a switching circuit for each pixel to control the optical state of the display. The switching circuit includes at least one diode and at least one load impedance for each circuit. The front plane electrode of the display may be unpatterned over a significant portion of the display. The display architecture is especially useful for bi-stable display media that require active matrix addressing, for example electrophoretic displays, and for applications using diodes based on organic semiconductors and/or printed diodes.

20 Claims, 9 Drawing Sheets

U.S. PATENT DOCUMENTS

2006/0145597 A1  7/2006  Brabec

OTHER PUBLICATIONS

NTera Inc. (www.ntera.com).
E Ink Inc. (www.eink.com.
Sipix (www.sipix.com).
www.plasticlogic.com.
International Search Report, dated Apr. 4, 2007, issued in Counterpart Application No. PCT/FI2006/050566.
International Preliminary Report on Patentability, dated May 22, 2008, issued in Counterpart Application No. PCT/FI2006/050566.

* cited by examiner

ACTIVE-MATRIX ELECTRONIC DISPLAY COMPRISING DIODE BASED MATRIX DRIVING CIRCUIT

CROSS-REFERENCE TO RELATED APPLICATIONS

This application claims priority to U.S. provisional patent application 60/776,795 filed 27 Feb. 2006 and is the national phase under 35 U.S.C. §371 of PCT/FI2006/050566 filed 19 Dec. 2006.

FIELD OF THE INVENTION

This invention relates to electronic displays and an improved switching control circuit based on diodes for the control of the circuit.

BACKGROUND AND PROBLEM TO BE SOLVED

In an electronic display, a material, called the display medium, changes its optical state, e.g. reflectivity, transmission or light emission, in response to an electrical signal such as a voltage or an injected current. Particularly widely used are liquid crystal displays (LCDs), which change either the polarization of light or the reflectivity for light under the influence of voltage. Typically the display architecture comprises a transparent front substrate coated with a transparent conductive electrode, e.g. Indium Tin Oxide (ITO), which may be patterned or unpatterned (the front plane), a back plane comprising electrodes which may optionally be transparent and an optional substrate which may also optionally be transparent, and the display medium place between the front and back plane. The control of the optical state of the display results from the application of a voltage between the front and back plane electrodes which creates an electric field across the display medium or injects a current into the medium. The display may be divided into segments or, for more complicated information, into so-called pixels organised into a matrix of rows and columns.

Some display media display image retention without being actively addressed, i.e. once an image is written to a display based on such a medium, no further power is needed to maintain the image, at least for a significant amount of time. Such displays are commonly called bi-stable, even though many such displays are not strictly speaking truly bi-stable (having two stable states of equal energy), and this terminology will be applied herein as well.

Two types of bi-stable displays that have generated significant interest for "electronic paper" applications are electrochromic displays, such as reported and provided by NTera Inc. (www.ntera.com), and electrophoretic displays such as are reported and provided by E Ink Inc. (www.eink.com) and Sipix (www.sipix.com). These displays show optical properties that in many ways are similar to ink on paper. However, these displays generally require an active matrix structure (an active electronic circuit controlling the electronic and optical state for each pixel) in order to display detailed information, as they are not addressable by passive matrix techniques and/or the response times are too slow for passive matrix line by line addressing.

Active matrix circuits may be constructed on the basis of thin film transistors (TFTs), which are three terminal devices, or two terminal devices such as rectifying diodes and MIM diodes. TFTs have become the standard technique for LCDs. In a TFT display, patterning is all done on the back plane of the display, with row and column lines connected to gate and source electrodes; the front plane electrode is typically unpatterned throughout the active area of the display. This has the advantage of reducing the requirements for alignment of front and back planes during assembly, which is especially important for displays which are made using printing technology and/or flexible substrates, e.g. using organic semiconductors for the TFTs (see, for example, www.plasticlogic.com). On the other hand, TFTs require very fine patterning steps and excellent semiconductor characteristics, especially charge carrier mobility, to perform adequately, and both issues become difficult when using printing technology and organic semiconductors.

Figure 1:
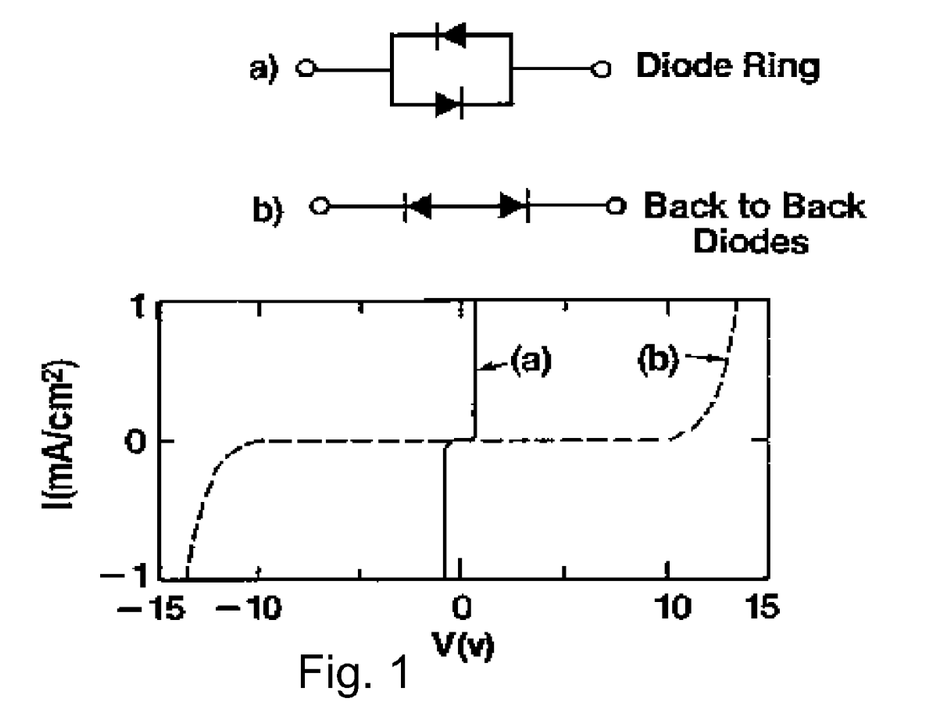
FIGS. 1-4 show examples of the known state of the art for diode based display driving circuits, which require a patterned front plane.

A number of diode-based active matrix back plane structures have been disclosed in the past and some have also been used commercially. Two structures are the diode ring and the back-to-back diode configuration, as seen in FIG. 1.

The display medium is in series with the diode circuit; the diode circuit and the display medium are placed between the row and column electrodes.

Figure 2:
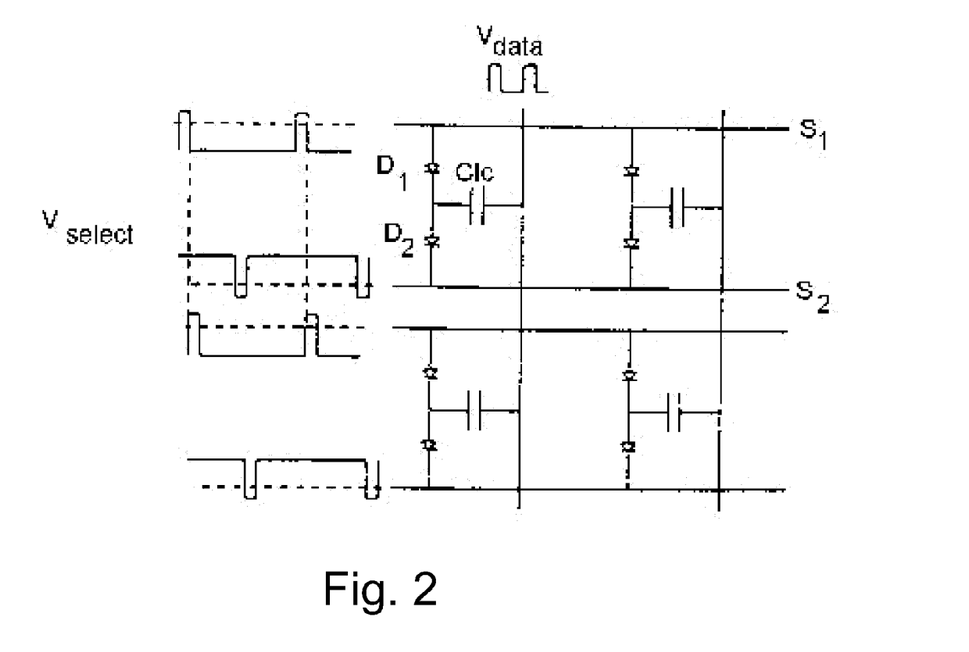

Another diode circuit design is called the two-diode switch, and the circuit is illustrated in FIG. 2. This circuit configuration requires both a patterned front plane electrode structure and two select lines for each row of pixels.

Figure 3:
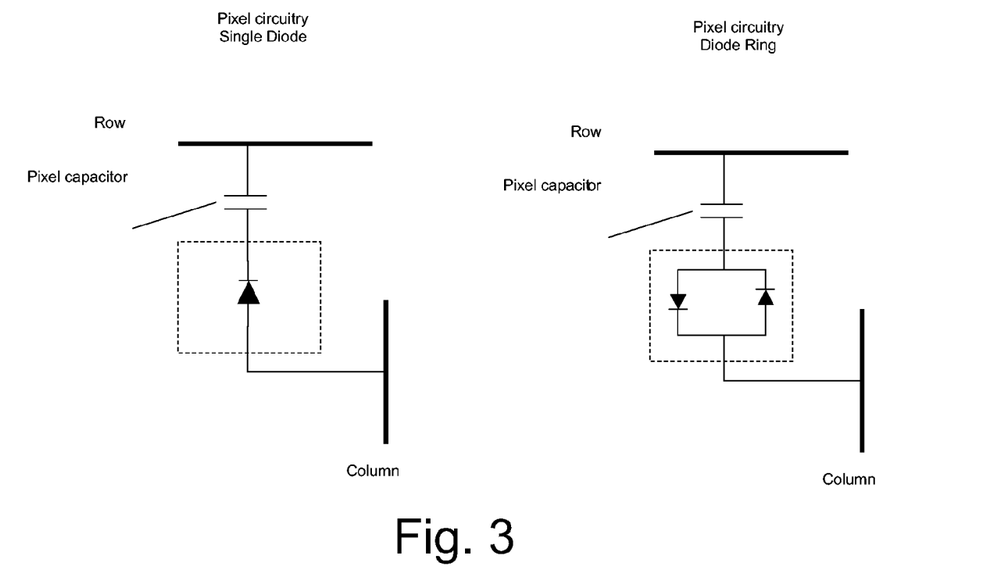

Patent application WO 2004/066410 discloses diode based circuits for active matrix back planes using single diode and back-to-back configurations, where the diodes are thin film diodes made using organic semiconductors (FIG. 3). Two potential advantages of organic diodes over organic TFTs are less stringent requirements on charge carrier mobility and less stringent requirements on resolution due to the vertical instead of horizontal structure of the charge conducting layer. These two advantages can be especially significant for cost-efficient, high-throughput printing based manufacturing of active matrix back planes, as the resolution achievable with standard printing methods is limited. As in FIGS. 1 and 2, a patterned front plane electrode is used.

Figure 4:
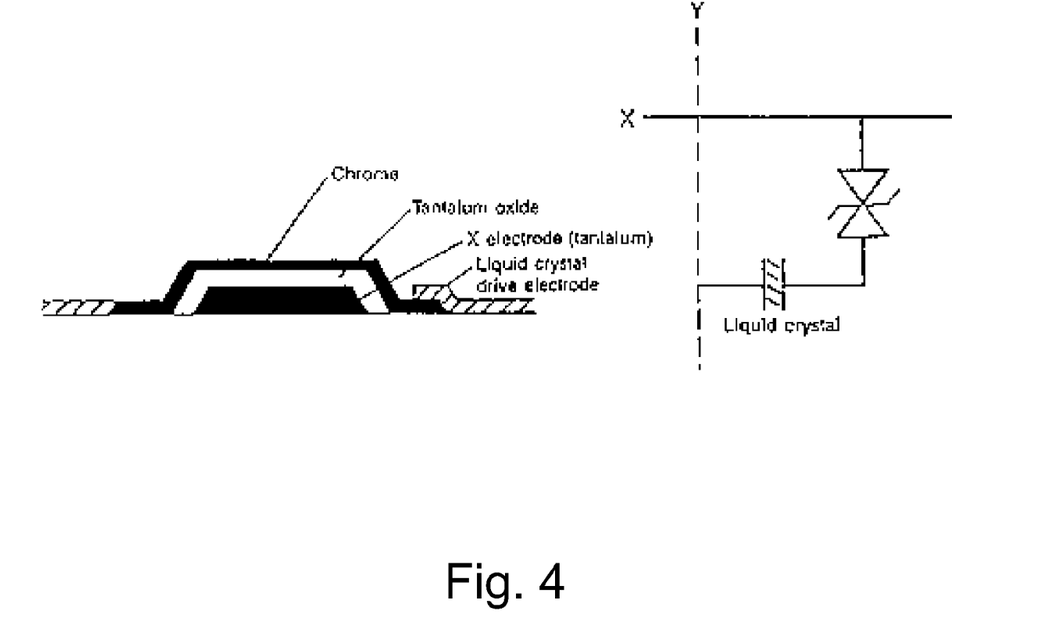

Metal-insulator-metal diode (M-I-M) diodes differ from rectifying diodes in that the current-voltage curves are symmetrical. MIM diodes have also been used to form active matrix back planes for displays; and example structure is shown in FIG. 4. Note that also here the display medium (here a liquid crystal) is in series with the diode element in between row and column electrodes, i.e. the front plane electrode must be structured.

Active matrix back planes based on solution processible MIM diodes have been disclosed in patent application disclosure WO 2004/051750 and in U.S. Pat. No. 6,380,922. In the former no description of a circuit or reduction to practice is given. In the latter, printed MIM diodes based on inorganic metal oxides are claimed for use in active matrix displays, preferably electrophoretic displays. An unpatterned front plane electrode is used in the proposed circuit, which can drive a single pixel, but no disclosure is made how an entire matrix of rows and columns could effectively be driven.

U.S. Pat. No. 6,980,196 discloses an electronic display where the display medium is particle based, e.g. electrophoretic, and controlled by an active matrix which may comprise printable nonlinear diode elements, the intention being the fabrication of a printable active matrix display. The display medium is placed in series with the nonlinear device between row and column electrodes, i.e. the disclosure requires patterned front plane electrodes. However, as mentioned above, having structured elements on both the front and back plane create additional alignment difficulty, especially if printing and lamination processes are used for display fabrication and assembly. Furthermore, some display media, e.g. electrophoretic and polymer-dispersed liquid crystal media, are frequently commercially available primarily as front plane laminates with the active display medium already laminated onto an unpatterned front plane.

SUMMARY OF THE INVENTION

Therefore an object of the invention is to disclose a diode based back plane circuit that can drive a display medium, especially a bistable display medium, effectively in a matrix configuration such that row and column address lines are both on the back plane and the front plane is essentially unpatterned in the active display area. Furthermore, the driving circuit matrix should be able to drive a full matrix display with good contrast between optical states, and with the highest possible power efficiency.

The invention discloses diode based backplane circuits that are able to drive a display medium, especially a bi-stable display medium, in an active matrix mode with a minimum of additional voltage and leakage current, without the need for a patterned front plane, and with optical performance comparable to directly driven displays and TFT active matrix displays In one embodiment, the diode active matrix back plane disclosed herein comprises a matrix of row and column address lines on the back plane, with two rectifying diodes in series between the row and column lines, plus a load impedance in series with the diodes and disposed between the second diode and the row line. The display medium is located between the backplane and an unstructured front plane electrode structure, and the back pixel electrode of the display medium is connected to the diode circuit between the two diodes. The back plane architecture and the addressing scheme used are suitable for bi-stable display media possessing a short circuit memory (i.e. able to maintain an image even when the front and back electrodes are connected and at the same potential) without a patterned front plane. All the pixel capacitors share a common front electrode In another embodiment of the invention, the display pixel electrode is still connected to the circuit between the two diodes, but the load resistor is made unnecessary, by choosing a diode-diode configuration in which the diodes have different forward resistances at chosen current values.

In a further embodiment of the invention, the pixel electrode is connected to the circuit between a source lead at either a driving voltage or ground and two diodes which are connected to the row and column lines. Depending on the source voltage and the direction of the diodes, this circuit functions like an AND or OR gate to drive the pixels. This circuit is also able to drive a bistable display with an unpatterned front plane.

According to a first aspect of the present invention there is provided a display comprising
 a plurality of row electrodes;
 a plurality of column electrodes;
 a plurality of pixels, each pixel of said plurality of pixels being assigned to a crossing of one row electrode and one column electrode;
 a plurality of pixel electrodes each assigned to one pixel;
 a plurality of pixel driving circuits for controlling the state of said plurality of pixels; and
 a display medium;
 wherein each of the driving circuits comprises
 a load impedance;
 a first diode connected between one row electrode and said pixel electrode; and
 a second diode connected between one column electrode and said pixel electrode, and
 said at least one row electrode, said at least one column electrode and said pixel electrode are on the same side of the display medium,
 wherein said first diode is forward connected from the row electrode to the pixel electrode, and said second diode is forward connected from the pixel electrode to the column electrode.

According to a second aspect of the present invention there is provided a circuit for driving a display, the display comprising
 a plurality of row electrodes;
 a plurality of column electrodes;
 a plurality of pixels, each pixel of said plurality of pixels being assigned to a crossing of one row electrode and one column electrode;
 a plurality of pixel electrodes each assigned to one pixel;
 wherein said driving circuit comprises
 a load impedance;
 a first diode connected between one row electrode and said pixel electrode; and
 a second diode connected between one column electrode and said pixel electrode,
 wherein said first diode is forward connected from the row electrode to the pixel electrode, and said second diode is forward connected from the pixel electrode to the column electrode.

DETAILED DESCRIPTION OF THE INVENTION

Figure 5:
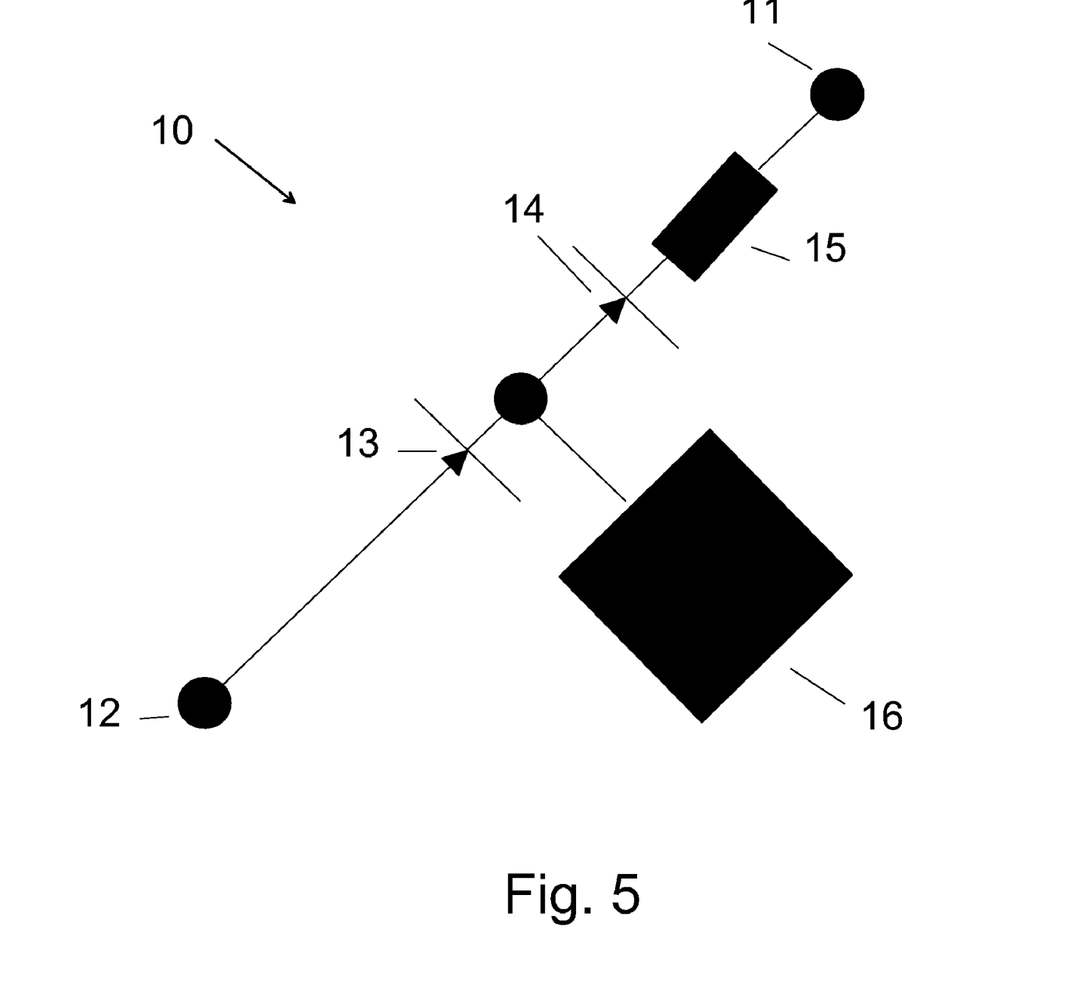
FIG. 5 shows the unit circuit for one pixel of one embodiment of the invention.

Four embodiments of the diode based matrix driving circuit are disclosed herein. In the description of these embodiments the following terminology will be used:
Row=Row
Col=Column
Pixel=Pixel
R=loading resistor
RRR=diode reverse resistance C=Pixel capacitance against front plane
Vs=source voltage
Vd=diode threshold voltage In one embodiment, a unit cell of which is shown in FIG. 5, the unit cell 10 (pixel) of the diode active matrix back plane disclosed herein comprises a connection to row address lines 11 and column address lines 12 on the back plane, with two rectifying diodes 13 and 14 in series between the row and column lines, plus a load impedance 15 in series with the diodes and disposed between the second diode and the row line. The display medium is located between the backplane and an unstructured front plane electrode structure, and the pixel back electrode 16 of the display medium is connected to the diode circuit between the two diodes.

Figure 6:
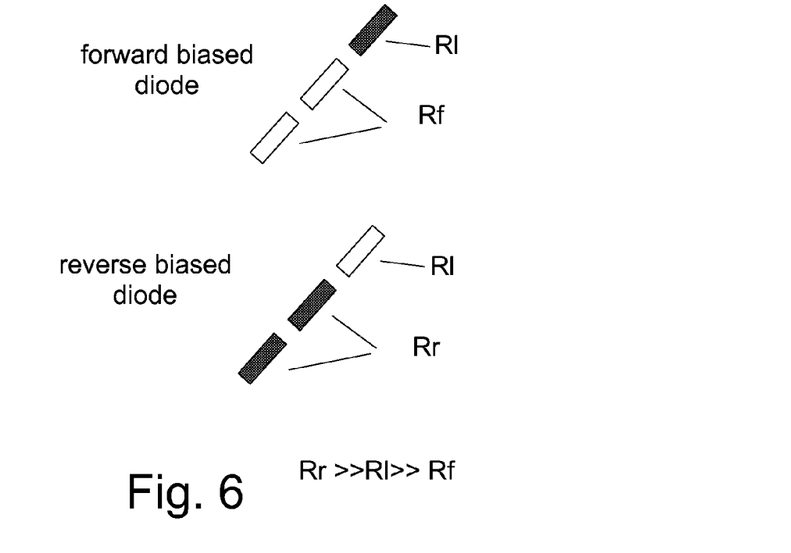
FIG. 6 demonstrates graphically the relationships between resistances under different driving conditions in one embodiment of the invention.

The relationship of impedances in a single pixel element is sketched in FIG. 6. In forward bias the resistance Rl of the load resistor 15 is dominant wherein the forward bias resistance Rf of the diodes 13, 14 is negligible and the voltage drop is essentially over this load resistor 15. In reverse bias the resistances Rr of the diodes 13, 14 are dominant wherein the resistance Rl of the load resistor 15 is negligible.

The following truth table describes the state of the pixel back electrode as a function of the voltages on the row 11 and column address line 12 to which it is connected via the circuit according to the invention. If the voltage in the row address line 11 (row voltage) is at 0 that row is selected and the state of the pixel can be changed. A voltage of 0 at the column address line 12 (column voltage) will cause a charged pixel to discharge at a time defined by the load resistance and the pixel capacitance, while an uncharged pixel remains uncharged. A column voltage of Vs will not change the state of a pixel electrode at Vs-Vd but will charge an uncharged pixel to Vs. If the row voltage is Vs (unselect), then a column voltage of 0 will in principle cause the pixel to charge or discharge to Vs/2 but due to the extremely high reverse bias resistance of the diodes this process will be too slow to observe and the pixel will remain in the same state. If the row and column are both at Vs, then the pixel electrode will be at Vs-Vd.

| Pixel | Row | Column |
| --- | --- | --- |
| RC –> 0, 0 | 0 | 0 |
| Vs – Vd | 0 | Vs |
| RRRC –> Vs/2 | Vs | 0 |
| Vs – Vd | Vs | Vs |

Based on the above truth table, it can be seen that for the example of a bistable display medium with short circuit memory (i.e. a medium for which the optical state does not change if the front and back electrodes are at the same potential) with the front plane at Vs-Vd, the situation in which both row voltage and column voltage are at 0 will force the pixel to a state with a potential of −(Vs-Vd), while for the other combinations the state of the pixel will be unchanged.

In addition to enabling the control of the pixel state, the loading impedance also enables to lower the current consumption of the diode active matrix backplane. This is due to the current limiting nature of the loading impedance. There are a number of preferential embodiments of this embodiment of the invention disclosed herein. It is advantageous if the load impedance is at least 100 kOhm and especially preferred if the load impedance is over 1 MOhm. The value of the loading impedance must be selected such that Rf<Rl<Rr, where Rf is the forward impedance of the diodes, Rl the load impedance of the pixel and Rr is the reverse impedance of the diodes.

The reverse bias current of the diodes is advantageously less than 1 μA per pixel, preferentially less than 1 nA. The rectification ratio of the diodes is advantageously larger than 100, and preferentially larger than 1000.

In another embodiment of the invention, the load resistor is replaced by a diode-diode configuration in which the diodes have different forward resistances at chosen current values. This can be taken into account with the driving wave forms by setting the pixel capacitors to the same voltage as the front plane.

There are other possible alternatives to realise a pixel driving scheme without structured front plane. In a further embodiment of the invention the driving scheme is realised with diode logic gated with either AND or OR structure.

Figure 7:
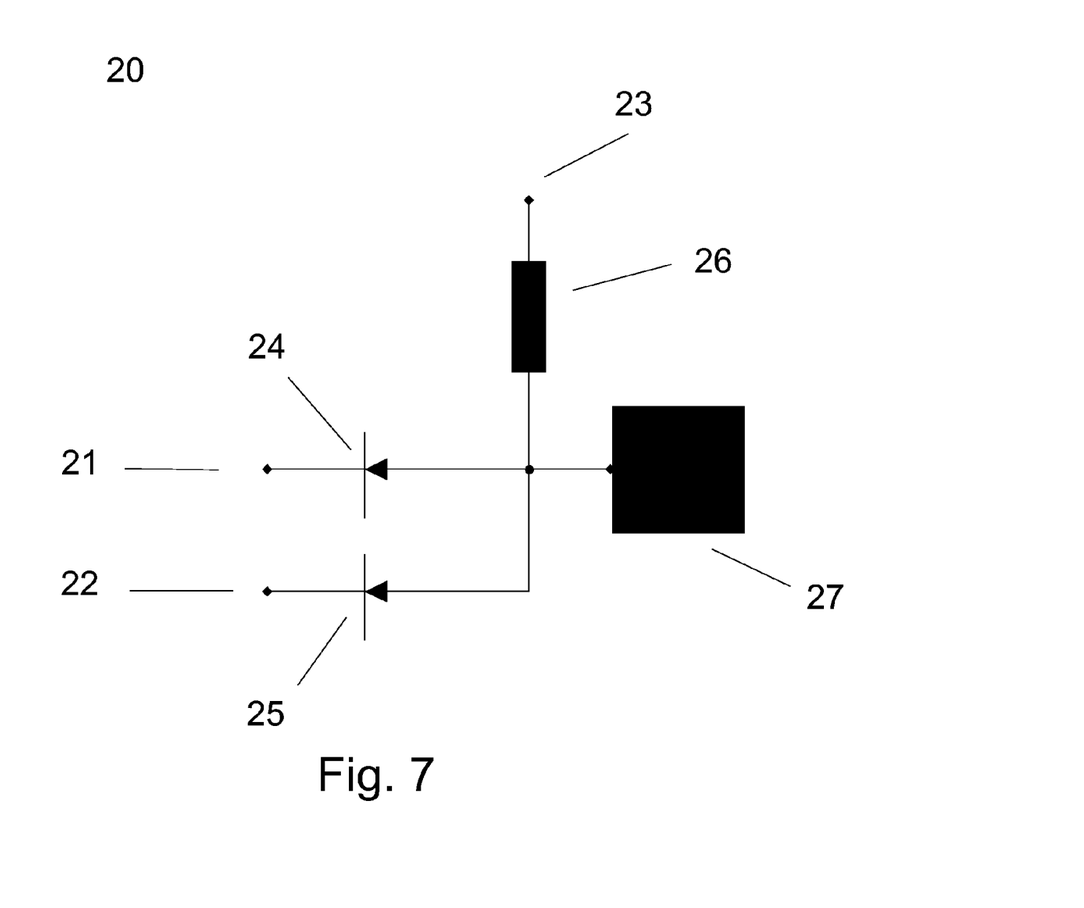
FIG. 7 shows the unit circuit for one pixel of another embodiment of the invention.

A unit circuit for the AND configuration is shown in FIG. 7 and the truth table is analysed similarly to the embodiment above. The unit cell 20 of the diode active matrix back plane comprises a connection to row and column address lines 21 and 22 and a source voltage Vs 23 on the back plane. Between the source and the row and column electrodes are disposed diodes 24 and 25 and load resistor 26. The back pixel electrode 27 is disposed between the load resistor and the diodes. In the AND configuration the pixel electrode is discharged to 0 unless both the row and column are at Vs.

Truth Table for AND

| Pixel | Row | Column |
| --- | --- | --- |
| RC –> 0 | 0 | 0 |
| RC –> 0 | 0 | Vs |
| RC –> 0 | Vs | 0 |
| Vs – Vd | Vs | Vs |

Figure 8:
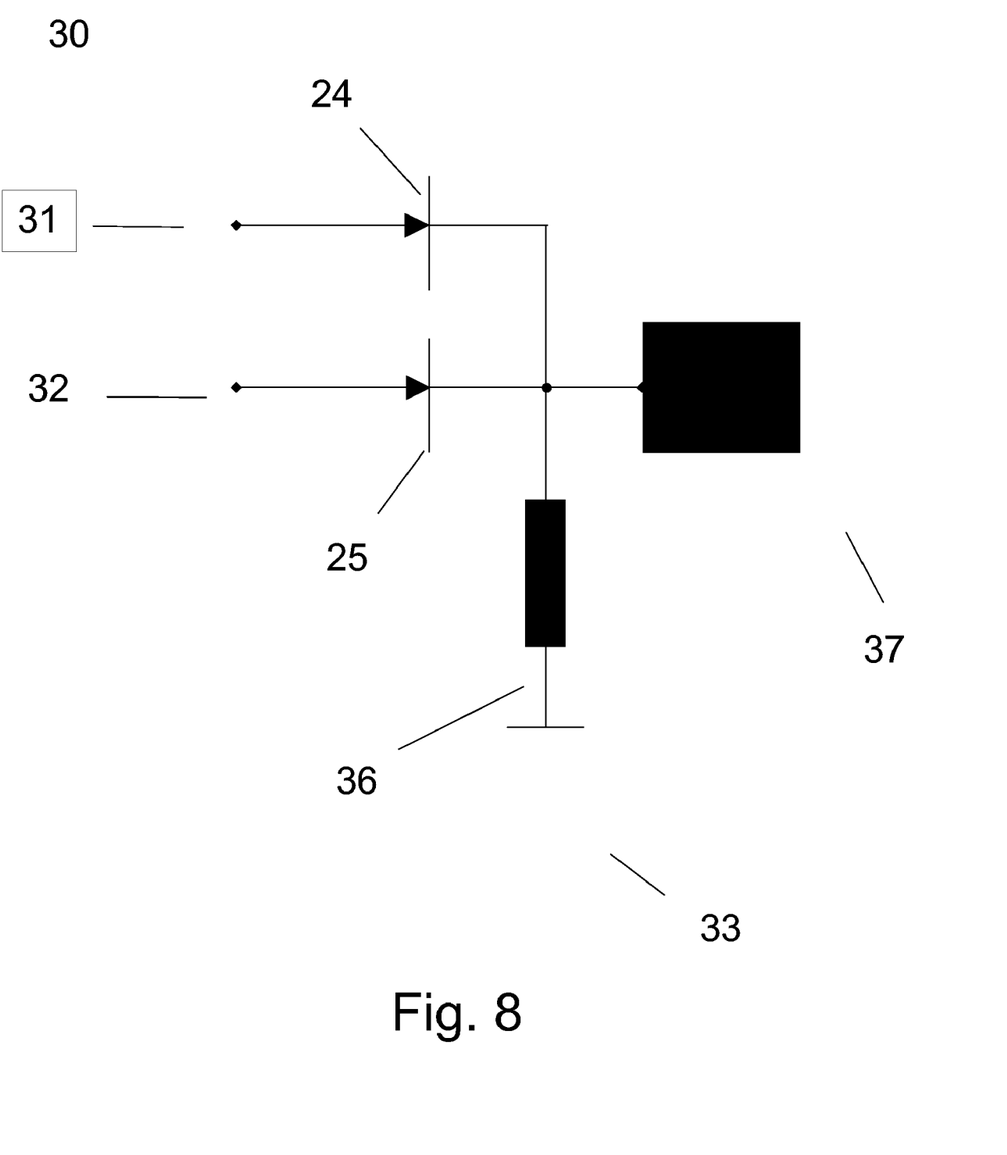
FIG. 8 shows the unit circuit for one pixel of further embodiment of the invention.

A unit circuit for the OR configuration is shown in FIG. 8 and the truth table is analysed similarly to the embodiment above. The unit cell 30 of the diode active matrix back plane comprises a connection to row and column address lines 31 and 32 and to a ground connection 33 on the back plane. Between the ground and the row and column electrodes are disposed diodes 24 and 25 and load resistor 26. The back pixel electrode 37 is disposed between the load resistor and the diodes. In the OR configuration the pixel electrode is at Vs if either the row is column are at Vs and 0 if both are at 0.

Truth Table for OR

| Pixel | Row | Column |
| --- | --- | --- |
| RC –> 0 | 0 | 0 |
| Vs – Vd | 0 | Vs |
| Vs – Vd | Vs | 0 |
| Vs – Vd | Vs | Vs |

Figure 9:
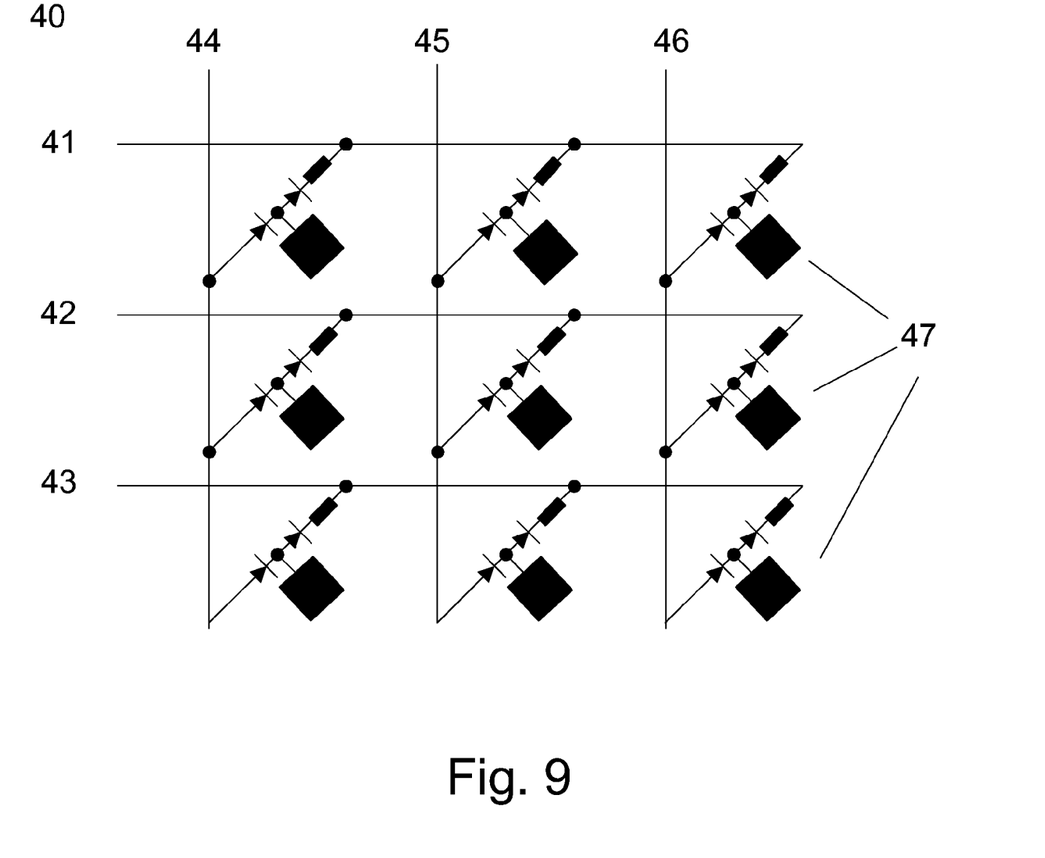
FIG. 9 shows an example of a backplane circuit for one embodiment of the invention.

A matrix backplane 40 can be constructed by connecting row electrodes and column electrodes together as described in FIG. 9 for the first embodiment described. Row electrodes 41-43 and column electrodes 44-46 are disposed on the back plane of a display, with unit circuits 47 disposed between the row and column electrodes as disclosed above.

The embodiments described above can drive a display under assumption that the display medium is bistable and has a short circuit memory, i.e. the medium does not change its optical state if there is no potential difference between the front and back plane electrodes.

A display driving scheme according to the invention is based on the fact that if there is no potential difference between the pixel electrode and the front plane the pixel remains optically unchanged. This enables possibility to construct a circuit and driving scheme in such a way that once a row is unselected all pixel electrodes in that row are in the same potential with front plane.

The following example illustrates a driving scheme for a bistable display according to FIG. 9.

The front plane potential is initially set to Vs-Vd. Setting a row to Vs results in a situation where all the pixels at that row will be set to Vs-Vd. As this is the same potential as the front plane the optical state of the pixel will remain unchanged. However if the row is selected by setting it to 0, which is a different potential compared to the front plane, it is possible to determine the pixel voltage by controlling the state of the column electrodes. If a column is set to Vs the pixel is unchanged, since the voltage in pixel electrode is Vs-Vd. If the column voltage is set to 0 the pixel voltage decays to 0 at a fairly rapid rate determined by the load resistance and generates a potential difference between the pixel electrode and front plane. Therefore the optical state of the pixel is changed as there is a potential difference between front plane and pixel electrode.

In a preferred embodiment of the driving scheme useful for display media that are sensitive to DC-imbalance, the pixel driving is reset at the end of each row driving sequence. This is done by setting all pixel electrodes to the same potential as front plane. This is done by setting the front plane to Vs-Vd, the row to be reset to Vs and all column electrodes to Vs.

In another preferred embodiment of the invention, the diodes comprise organic semiconductor material, especially solution processed organic semiconductor material. It is especially preferred if the diodes and if possible also the resistors are deposited by printing techniques, especially for organic semiconductor diodes. In another preferred embodiment the display medium is a bi-stable display medium, especially a reflective display medium, and in particular an electrophoretic display medium. It is especially preferred if the back plane, the front plane and the display medium are all flexible. Geometries In another embodiment of the invention a display is manufactured by preparing a back plane structure according to the circuits described above, with the same advantageous embodiments as described for the circuit and the display, then laminating a display medium previously laminated onto an unpatterned front plane electrode structure to the back plane to make an active matrix display.

Figure 10:
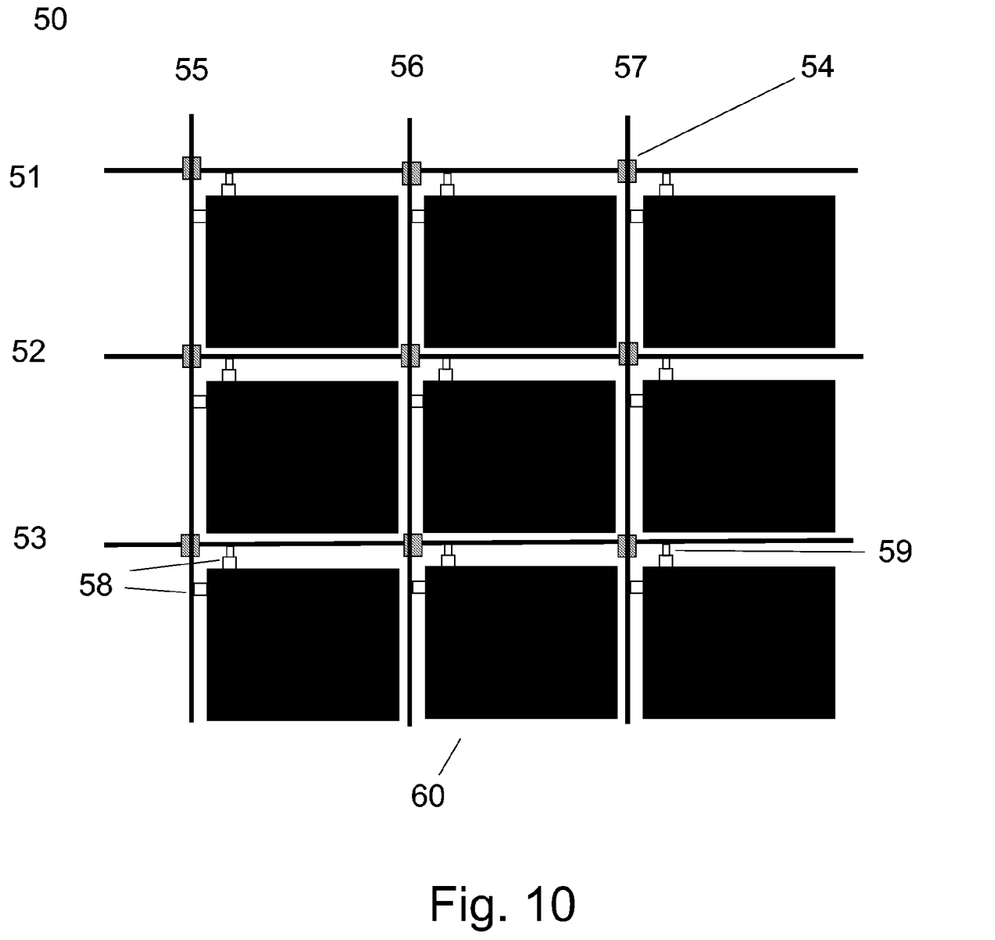
FIG. 10 shows an embodiment of the invention in which the driving circuit is disposed laterally to the display pixel electrode.

The circuit components may be situated next to the pixel electrode, with lateral contacts from the appropriate terminals of the diode to the pixel, as shown in FIG. 10 for the example of the first embodiment of the invention disclosed herein. An active matrix backplane 50 comprises row lines 51-53, insulators 54 disposed on top of the row lines, column lines 55-57 crossing the row lines at the points where the insulators are deposited, and between the row and column lines diodes 58, resistors 59 and pixel electrodes 60 laterally oriented and connected in such as way as to form unit cells as shown in FIG. 5.

For display media that are opaque, such as electrophoretic or rotating ball displays, it may be preferable to dispose the diode matrix underneath rather than next to the pixel electrode, a geometry which may be referred to as a "vertical pixel architecture".

WO 2004/070466 discloses a version of a vertical pixel architecture, useful for e.g. electrophoretic displays, on the basis of thin film transistors (TFTs), whereby the pixel electrode is disposed above the TFT matrix, separated by a dielectric material layer, and connected to the drain electrode by means of a via hole in the dielectric. U.S. Pat. No. 6,232,950 discloses a display architecture in which conductors are disposed onto a substrate, covered by a dielectric layer with via holes, and a pixel electrode is deposited onto the dielectric layer in such a way that the via holes are filled and electrical connection is made to the lead lines.

Figure 11:
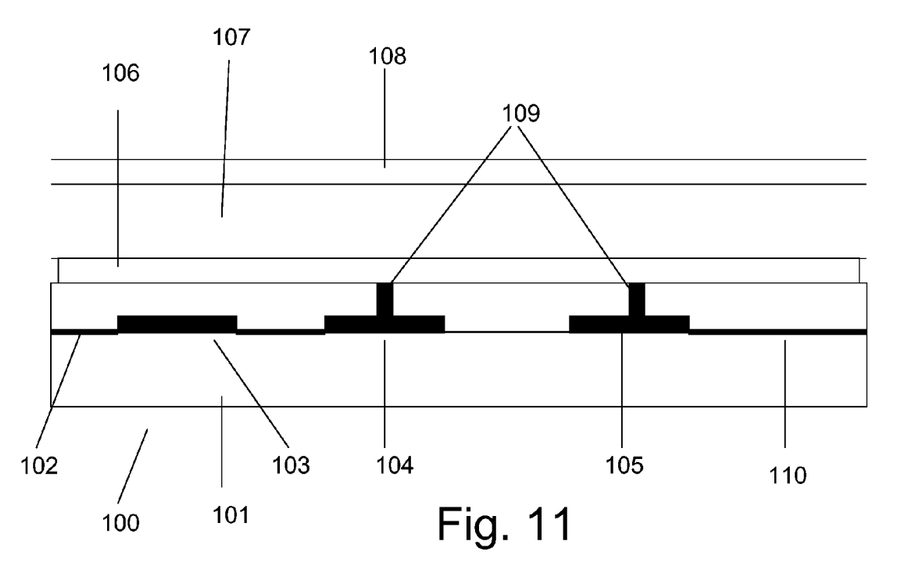
FIG. 11 show a first embodiment of the invention in which the driving circuit is disposed vertically to the display pixel electrode.

A matrix based on thin film diodes and resistors, i.e. a structure comprising not only conductive patterns but also active components comprising semiconductors may also be disposed underneath the pixel electrode. FIG. 11 demonstrates one embodiment of such a display architecture according to the invention in the example of a single pixel 100. Upon a substrate 101 are disposed a row line 102, resistor 103, diodes 104 and 105, column line 110 and a dielectric layer comprising vias 109. Upon this is disposed a pixel electrode 106 in such a way that the vias are filled and make contact between the pixel electrode and the driving circuit. The display electrode 106 is adjacent to the display medium 107 and the front plane electrode 108.

U.S. Pat. No. 6,445,374 discloses a display architecture in which conductors are disposed onto one side of a substrate comprising via holes at appropriate locations, the pixel electrodes are disposed onto the other side of the substrate and contact is made through filling of the via holes.

Figure 12:
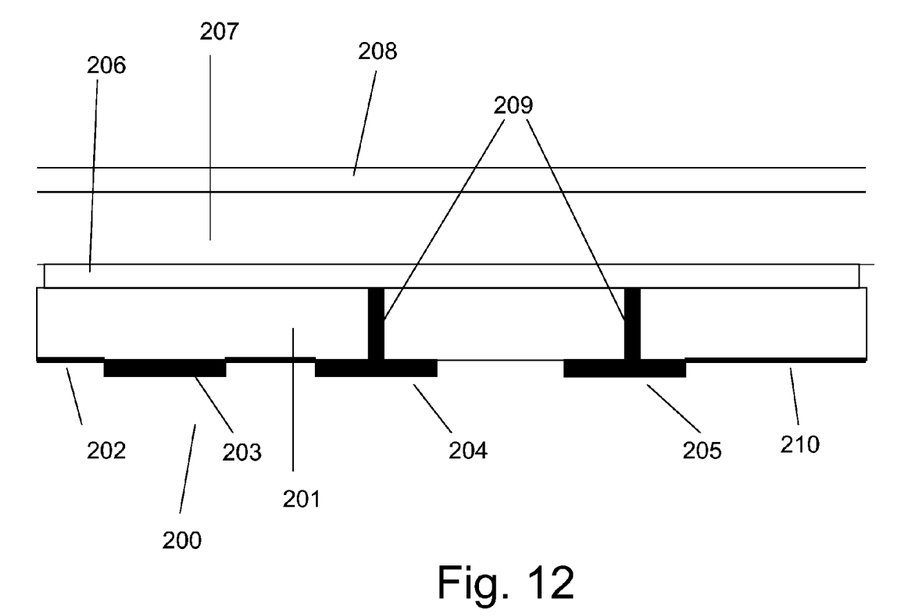
FIG. 12 show a second embodiment of the invention in which the driving circuit is disposed vertically to the display pixel electrode.

In another embodiment of a vertical pixel architecture for circuits according to the invention, as sketched in FIG. 12 in the example of a single pixel 200. Upon a substrate 201 comprising vias 209 are disposed on one side of the substrate a row line 202, resistor 203, diodes 204 and 205 and column line 210. On the other side of the substrate 201 is disposed a pixel electrode 206 in such a way that the vias are filled and make contact between the pixel electrode and the driving circuit. The display electrode 206 is adjacent to the display medium 207 and the front plane electrode 208.

Similar vertical pixel architectures can be based on the other embodiments of the invention disclosed herein, according to the same principles as outlined in FIGS. 11 and 12.

Figure 13:
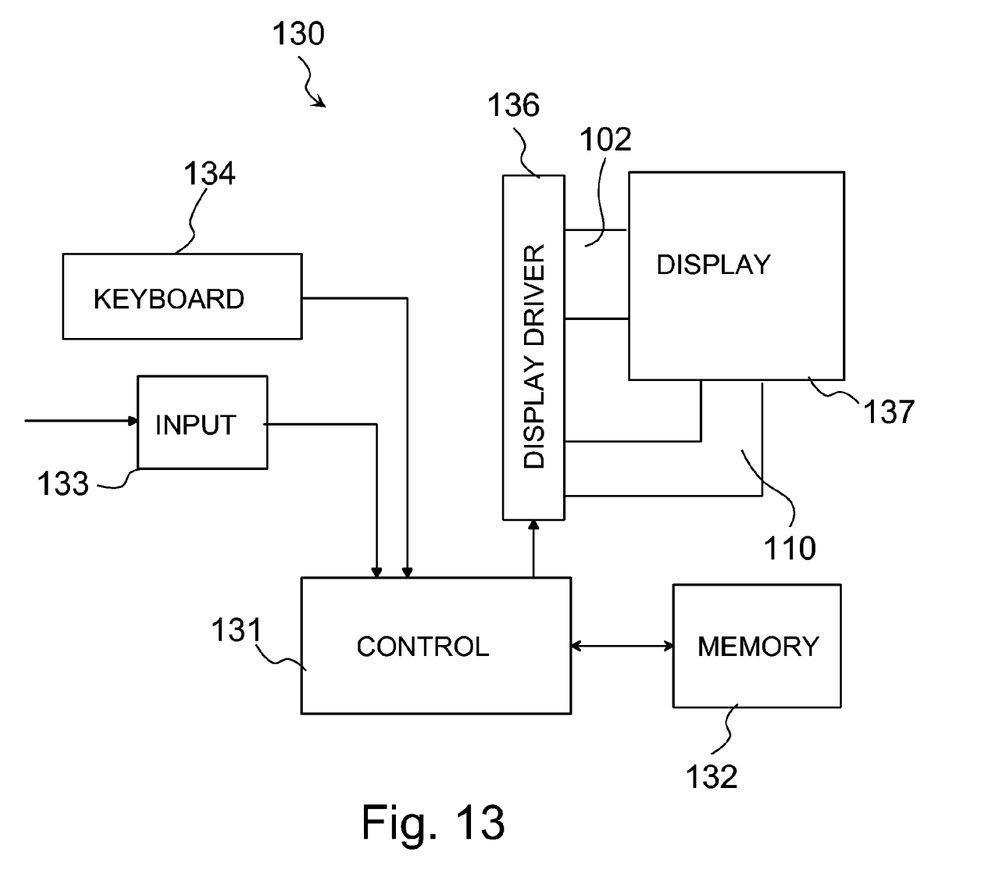
FIG. 13 show an example of a device in which the invention can be applied.

FIG. 13 illustrates an example of a device 130 in which the driving system of the present invention can be implemented. The device 130 is, for example, an electronic price label, an information display, etc. The device 130 comprises a controller 131 for controlling the operation of the device 130. The device 130 also comprises a memory 132 for storing information, software programs, parameters etc. The device may also have an input element 133 for inputting information such as price data, updated versions of software, new parameter values, etc. The device 130 may also comprise a keyboard 134 which the user can use to input data to the device 130. The display driver 136 of the device 130 forms the row and column voltages for each row address lines and column address lines so that pixels of the display 137 are in a desired state to show information to be displayed. Also when the information to be displayed changes the display driver 136 makes the necessary adjustments to the row and column voltages. It is noted here that the row and column voltages are dependent on inter alia which of the embodiments disclosed herein is used.

Information to be shown may be stored into the memory 132. For bi-stable media, especially those which are sensitive to DC-imbalance and/or such media in displays that should display grey scales, the memory may contain also a look-up table in which the current state of each pixel is stored, since the driving waveform needed to switch the pixel to another state or maintain the current state depends on the current state of the pixel. The controller 130 reads the information from the memory 132 e.g. pixel by pixel and sends the information to the display driver 136. The display driver 136 sets correct row and column voltages on the row and column address lines as was disclosed above in connection with FIG. 9. Changes to row and column voltages are only necessary when one or more pixel states need to be changed thus power consumption can be kept very low.

The driving circuit of the invention is also applicable to colour display. For colour displays each pixel element is divided into a plurality of sub-pixels, e.g. red, green and blue or cyan, yellow and magenta, each created for example by use of an appropriate colour filter with a black and white display medium or use of patterned display media with different colours. In some cases a white sub-pixel may also be added to a reflective display to increase the display brightness. Each sub-pixel will then be controlled by its own pixel control circuit as disclosed herein.

The invention claimed is:

1. A driving circuit for a bistable display, the driving circuit comprising:
    a first terminal configured to be directly connected to a row electrode of the bistable display;
    a second terminal configured to be directly connected to a column electrode of the bistable display;
    a third terminal configured to be directly connected to a pixel electrode of the bistable display; a load impedance; a first rectifying diode directly connected between the second terminal and the third terminal; and a second rectifying diode connected in series with the load impedance between the first terminal and the third terminal, wherein said first rectifying diode is forward connected from the second terminal to the third terminal, said second rectifying diode is forward connected from the third terminal to the load impedance, and said load impedance is directly connected to the first terminal, and wherein said at least one row electrode, said at least one column electrode and said pixel electrode are on a same side of the bistable display, and
    wherein said first rectifying diode is forward connected from the second terminal to the third terminal, and said second rectifying diode is forward connected from the first terminal to the third terminal.

2. The driving circuit according to claim 1, wherein said load impedance comprises a load resistor.

3. The driving circuit according to claim 1, wherein said load impedance is embedded in one of the rectifying diodes.

4. The driving circuit according to claim 2, wherein the driving circuit is formed on a back plate of the bistable display, the driving circuit further comprising:
    a substrate, wherein the row electrode, the column electrode, the load impedance, the first rectifying diode, and the second rectifying diode are on the substrate; and
    a dielectric layer having a via for connecting the pixel electrode to the driving circuit.

5. The driving circuit according to claim 1, wherein said first rectifying diode is forward connected from the row electrode to the pixel electrode, and said second rectifying diode is forward connected from the column electrode to the pixel electrode.

6. The driving circuit according to claim 1, wherein said first rectifying diode is forward connected from the pixel electrode to the row electrode, and said second rectifying diode is forward connected from the pixel electrode to the column electrode.

7. The driving circuit according to claim 1, wherein said first reverse bias current of the rectifying diodes is less than 1 μA per pixel.

8. The driving circuit according to claim 1, wherein said first reverse bias current of the rectifying diodes is less than 1 nA per pixel.

9. The driving circuit according to claim 1, wherein at least one of the rectifying diodes comprises organic semiconductor material.

10. A display, comprising:
    a plurality of row electrodes;
    a plurality of column electrodes;
    a plurality of pixels, each pixel of said plurality of pixels being assigned to a crossing of one row electrode and one column electrode;
    a plurality of pixel electrodes each assigned to one pixel;
    a bistable display medium; and
    a plurality of driving circuits each comprising a first terminal directly connected to one of the row electrodes, a second terminal directly connected to one of the column electrodes, a third terminal directly connected to one of the pixel electrodes, a load impedance, a first rectifying diode directly connected between the second terminal and the third terminal, and a second rectifying diode directly connected in series with the load impedance between first terminal and the third terminal, wherein said second rectifying diode is forward connected from the third terminal to the load impedance, and said load impedance is directly connected to the first terminal, wherein said first rectifying diode is forward connected from second terminal to the third terminal, and said second rectifying diode is forward connected from the first terminal to the third terminal
    wherein said at least one row electrode, said at least one column electrode and said pixel electrode are on a same side of the bistable display medium.

11. The display according to claim 10, wherein said load impedance comprises a load resistor.

12. The display according to claim 10, wherein said load impedance is embedded in one of the rectifying diodes.

13. The display according to claim 11, wherein the driving circuit is formed on a back plate of the bistable display, the driving circuit further comprising a substrate, wherein the row electrode, the column electrode, the load impedance, the first rectifying diode, and the second rectifying diode are on the substrate, and the driving circuit further comprising a dielectric layer having a via for connecting the pixel electrode to the driving circuit.

14. The display according to claim 10, wherein said first rectifying diode is forward connected from the row electrode to the pixel electrode, and wherein said second rectifying diode is forward connected from the column electrode to the pixel electrode.

15. The display according to claim 10, wherein said first rectifying diode is forward connected from the pixel electrode to the row electrode, and said second rectifying diode is forward connected from the pixel electrode to the column electrode.

16. The display according to claim 10, wherein said first reverse bias current of the rectifying diodes is less than 1 μA per pixel.

17. The display according to claim 10, wherein said first reverse bias current of the rectifying diodes is less than 1 nA per pixel.

18. The display according to claim 10, wherein at least one rectifying diode comprises organic semiconductor material.

19. A device, comprising:
    a display comprising a plurality of row electrodes;
    a plurality of column electrodes;
    a plurality of pixels, each pixel of said plurality of pixels being assigned to a crossing of one row electrode and one column electrode;
    a plurality of pixel electrodes each assigned to one pixel;

a bistable display medium; and a plurality of driving circuits each comprising a first terminal directly connected to one of the row electrodes, a second terminal directly connected to one of the column electrodes, a third terminal directly connected to one of the pixel electrodes, a load impedance, a first rectifying diode directly connected between the second terminal and the third terminal, and a second rectifying diode directly connected in series with the load impedance between first terminal and the third terminal, wherein said first rectifying diode is forward connected from the second terminal to the third terminal, said second rectifying diode is forward connected from the third terminal to the load impedance, and said load impedance is directly connected to the first terminal, and wherein said first rectifying diode is forward connected from second terminal to the third terminal, and said second rectifying diode is forward connected from the first terminal to the third terminal, wherein at least one of the row electrodes, at least one of the column electrodes and at least one of the pixel electrodes are on a same side of the display medium.

20. A driving circuit for a bistable display, the driving circuit comprising:

a first terminal configured to be directly connected to a row electrode of the bistable display;

a second terminal configured to be directly connected to a column electrode of the bistable display;

a third terminal configured to be directly connected to a pixel electrode of the bistable display;

a load impedance;

a first diode directly connected between the second terminal and the third terminal; and a second diode directly connected in series with the load impedance between the first terminal and the third terminal, wherein said first rectifying diode is forward connected from the second terminal to the third terminal, and said second rectifying diode is forward connected from the first terminal to the third terminal, wherein said first rectifying diode is forward connected from the second terminal to the third terminal, said second rectifying diode is forward connected from the third terminal to the load impedance, and said load impedance is directly connected to the first terminal, and wherein said at least one row electrode, said at least one column electrode and said pixel electrode are on a same side of the bistable display, and wherein a back plane, a front plane and a display medium of the driving circuit are flexible.

* * * * *